United States Patent [19]

Johannes

[11] Patent Number: 4,993,978
[45] Date of Patent: Feb. 19, 1991

[54] BOAT MOTOR REFLECTOR

[76] Inventor: John T. Johannes, 211 Meade, Erie, Pa. 16509

[21] Appl. No.: 491,737

[22] Filed: Mar. 12, 1990

[51] Int. Cl.⁵ .............................................. G02B 5/12
[52] U.S. Cl. ................... 440/71; 114/145 A; 114/343; 350/97; 440/113; 440/900
[58] Field of Search .................. 440/71, 113, 900; 114/343, 145 A; 350/97, 99; 280/414.1

[56] References Cited

U.S. PATENT DOCUMENTS

| | | | |
|---|---|---|---|
| 2,078,179 | 4/1937 | Johnson et al. | 114/145 A |
| 2,963,000 | 12/1950 | Fester | 440/71 |
| 3,136,280 | 6/1954 | Bergam | 114/145 A |
| 3,633,531 | 1/1972 | Hayes | 114/145 A |
| 3,885,146 | 5/1975 | Whitley | 280/414.1 |
| 4,286,309 | 8/1981 | Rasinski | 280/414.1 |

Primary Examiner—Sherman Basinger
Assistant Examiner—Thomas J. Brahan
Attorney, Agent, or Firm—Charles L. Lovercheck; Wayne L. Lovercheck

[57] ABSTRACT

An outboard motor signal made up of a plate-like member bent at right angles at one end as a support and bent at 30 degrees at the other end, whereby the other end is disposed substantially vertical when the outboard motor is in position for transportation, thereby improving the visibility of the signal. A U-shaped spring is provided to hold the plate-like member in place on the motor and reflective tape is disposed on the outside of the plate-like member.

4 Claims, 1 Drawing Sheet

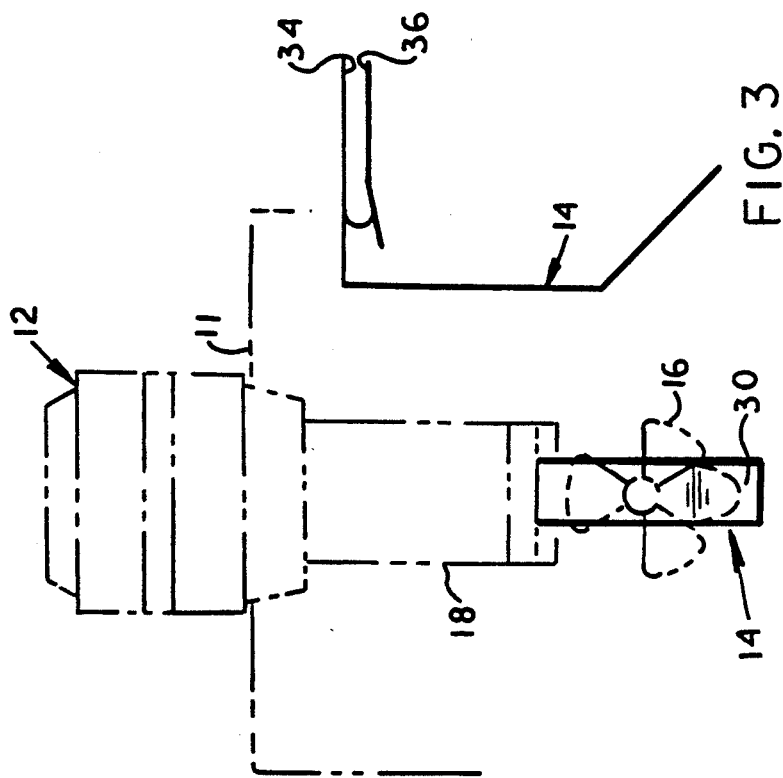
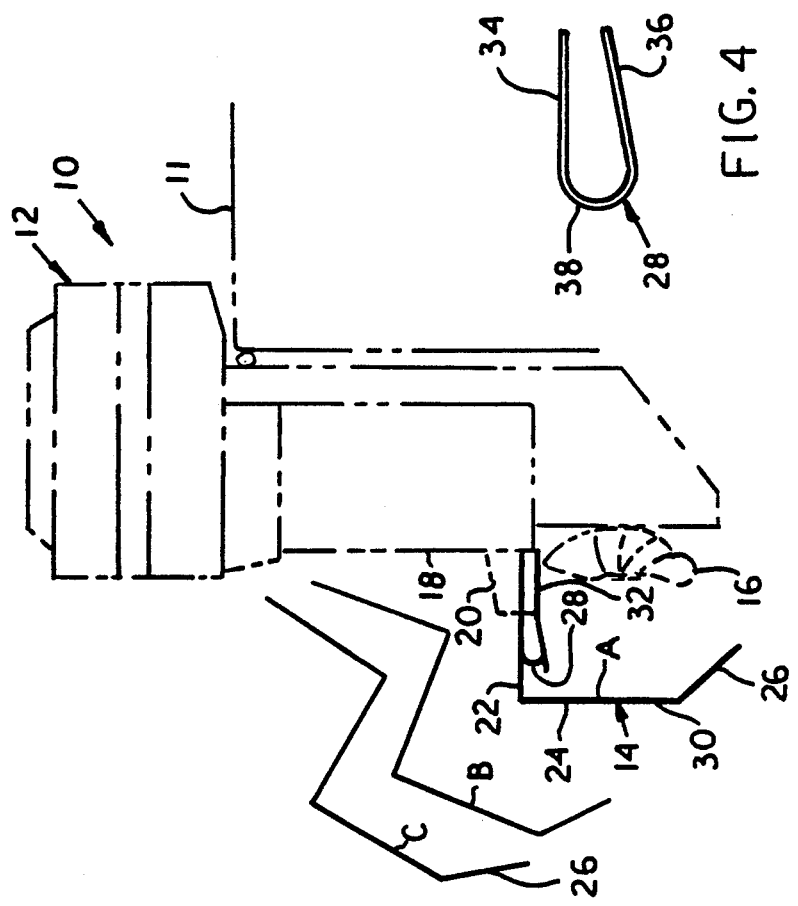

BOAT MOTOR REFLECTOR

BACKGROUND OF THE INVENTION

This invention relates to motors on motor boats and more particularly, boats to be transported by trailers.

Motors on boats being trailered are frequently difficult to see by overtaking motorists and therefore accidents are caused. Applicant has discovered that by providing a single efficient reflector supported on the drive train of the boat being transported by trailer, the reflector can be readily observed by motorists overtaking the boat and trailer. It has been discovered that a reflector made of a plate-like member having a reflecting surface and supported on an outboard motor will call attention to the boat and prevent many accidents. There is a law stating anything protruding three feet from the back of a vehicle must have an identifying feature, such as a red flag or the like. The reflector disclosed herein complies with the above law. The reflector may be made of steel plate metal or may also be made up of one part being molded of plastic material.

Applicant is aware of the following U.S. Pat. Nos:

| | |
|---|---|
| 3,045,749 to Brandon | 4,045,122 to Burdick |
| 3,080,581 to Smihal | 4,395,749 to Poveromo |
| 3,584,704 to Eckmann | 4,448,387 to Gilbreath |
| 3,788,502 to Bell | 4,616,591 to Minor |
| 3,870,875 to Altimus | 4,623,338 to Larson |

None of the above listed patents shown a boat motor reflector like applicant's.

SUMMARY OF THE INVENTION

The present invention involves an elongated plate-like member bent to form three parts, integrally connected together, which include an upper part, an intermediate part and a lower part. The upper part is disposed at a right angle to the intermediate part and the lower part is disposed at about 45 degrees to the intermediate part. The upper part is attached to the motor by a unique device. The plate has reflector tape thereon which will be visible to motorists and will prevent automobiles from colliding with the motor and boat on which the motor is mounted.

It is an object of the invention to provide an improved boat motor reflector.

Another object is to provide a boat motor reflector that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1 is a side view of the safety device according to the invention with the outboard motor shown in phantom.

FIG. 2 is a rear view of the safety device according to the invention with the outboard motor shown in phantom.

FIG. 3 is an enlarged side view of the safety device with a part of the boat shown in phantom.

FIG. 4 is an enlarged side view of the spring.

DESCRIPTION OF THE PREFERRED EMBODIMENT

Now with more particular reference to the drawing, shown in combination 10 is outboard motor 12 supported on boat 11 to be trailered. Outboard motor 12 has reflector member 14 supported thereon and drive train housing 18. Propeller 16 is supported on outboard motor 12 below drive train housing 18. Upper rearwardly extending housing member 20 and lower rearwardly extending housing member 32, with a space therebetween, are attached to drive train housing 18 and disposed above propeller 16.

Reflector member 14, is an elongated plate-like member having upper plate part 22, intermediate plate part 24 and lower plate part 26. Reflector member 14 extends around propeller 16. Upper plate part 22 is integrally attached to intermediate plate part 24 and extends generally perpendicular thereto. Lower plate part 26 is also integrally connected to intermediate plate part 24 and extends downwardly and forwardly at an obtuse angle.

U-shaped spring 28 has first leg 34 and second leg 36 integrally connected together by connecting part 38. Spring 28 may be made of flat steel spring stock or plastic.

Upper plate part 22 is disposed in the space under upper rearwardly extending housing member 20. U-shaped spring 28 is forced between upper plate part 22 and lower rearwardly extending housing member 32 thereby forcing upper plate part 22 into engagement with upper rearwardly extending housing member 20. Therefore lower rearwardly extending housing member 32 supports U-shaped spring 28 and holds upper plate part 22 in place whereby U-shaped spring 28 holds reflector member 14 in position.

During normal usage, outboard motor 12 will normally be in the full line position A. During transportation, outboard motor 12 may be swung upwardly and rearwardly to phantom line position B or to phantom line position C as shown in FIG. 1. Reflecting surface 30 on intermediate plate part 24 is disposed generally vertical when outboard motor 12 is swung up to phantom line position A. When boat 11 is to be transported, reflecting surface 30 on lower plate part 26 is vertical, when motor 12 is swung to phantom line position C. Reflecting surface 30 of reflector member 14 may be reflective tape, reflective paint or other reflective coating.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, an outboard motor adapted to be supported on a boat to be trailered and a reflector member, said outboard motor having a drive train housing supported on said outboard motor, a propeller supported on said motor below said drive train housing, an upper rearwardly extending housing member and a lower rearwardly extending housing member fixed to said drive train housing, said reflector member comprising an upper plate part, an intermediate plate part, and a lower plate part, said upper plate part extends generally perpendicular to said intermediate plate part and underlies said upper rearwardly extending housing member, said upper plate part disposed between said upper rearwardly extending housing member and said lower rearwardly extending housing member, clamping means disposed below said upper plate part urging said upper plate part into clamped relation with said upper rearwardly extending housing member whereby said reflector member is supported on said intermediate plate part in a generally vertical position and said lower plate part extends downwardly and forwardly when said outboard motor is in its normal position on said boat and whereby said lower plate part is disposed generally vertical when said outboard motor is swung rearwardly and upwardly to a position for trailering said boat.

2. The combination recited in claim 1 wherein said lower rearwardly extending housing member is attached to said drive train housing and disposed below said upper rearwardly extending housing member, said clamping means comprising a U-shaped spring inserted between said upper plate part and said lower rearwardly extending housing member, said spring means having a connecting part connecting a first leg and a second leg of said spring together, said connecting part being received between said upper plate part and said lower rearwardly extending housing member.

3. The combination recited in claim 2 wherein said lower plate part is disposed at an obtuse angle to said intermediate plate part and integrally attached thereto.

a reflecting surface of said reflector member is disposed generally horizontal when said outboard motor is swung up to an acute angle of about 30 degrees to a position for transporting said boat.

4. The combination recited in claim 3 wherein said reflecting surface is reflective tape.

* * * * *